(12) United States Patent
Tao et al.

(10) Patent No.: US 10,164,898 B2
(45) Date of Patent: Dec. 25, 2018

(54) METHOD AND APPARATUS FOR CLOUD SYSTEM

(71) Applicant: EMC IP HOLDING COMPANY LLC, Hopkinton, MA (US)

(72) Inventors: Jun Tao, Shanghai (CN); Yu Cao, Beijing (CN); Xiaoyan Guo, Beijing (CN); Sanping Li, Beijing (CN); Junping Frank Zhao, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 188 days.

(21) Appl. No.: 15/388,127

(22) Filed: Dec. 22, 2016

(65) Prior Publication Data

US 2017/0195247 A1  Jul. 6, 2017

(30) Foreign Application Priority Data

Dec. 31, 2015 (CN) .......................... 2015 1 1031818

(51) Int. Cl.
| | |
|---|---|
| *G06F 15/173* | (2006.01) |
| *H04L 12/911* | (2013.01) |
| *H04L 29/08* | (2006.01) |
| *G06F 9/50* | (2006.01) |

(52) U.S. Cl.
CPC .......... *H04L 47/70* (2013.01); *H04L 67/1097* (2013.01); *G06F 9/5027* (2013.01); *H04L 47/822* (2013.01)

(58) Field of Classification Search
CPC ... H04L 47/70; H04L 67/1097; H04L 47/822; G06F 9/5027
USPC .......................... 709/223, 224, 226; 718/104
See application file for complete search history.

(56) References Cited

U.S. PATENT DOCUMENTS

2016/0142323 A1* 5/2016 Lehmann .............. H04L 47/215
709/226
2016/0283270 A1* 9/2016 Amaral ................. G06F 9/5027

\* cited by examiner

*Primary Examiner* — Liang Che A Wang
*Assistant Examiner* — Johnny B Aguiar
(74) *Attorney, Agent, or Firm* — Krishnendu Gupta; Konrad R. Lee (57) ABSTRACT

Embodiments of the present disclosure provide a method and apparatus for a cloud system. The method includes: dynamically selecting, based on available infrastructure resources and at least one resource request, a scheduling strategy from a set of candidate scheduling strategies; and applying the selected scheduling strategy to schedule the infrastructure resources to serve the at least one resource request. Through embodiments of the present disclosure, when a single resource request or a batch of resource requests arrive, the most appropriate scheduling strategy is dynamically selected to generate an optimal allocation scheme for the request(s), thereby achieving cost-effective operations with the service level requirement of the resource request(s) satisfied.

10 Claims, 4 Drawing Sheets

METHOD AND APPARATUS FOR CLOUD SYSTEM

RELATED APPLICATIONS

This application claim priority from Chinese Patent Application Number CN201511031818.0, filed on Dec. 31, 2015 at the State Intellectual Property Office, China, titled "METHOD AND APPARATUS FOR CLOUD SYSTEM" the contents of which is herein incorporated by reference in its entirety.

FIELD

Embodiments of the present disclosure generally relate to a computer-related technical field, and more particularly, to a method and apparatus for a cloud system.

BACKGROUND

A cloud system has been popular as a new paradigm of system deployment. Its utility computing mode allows tenants to build their own infrastructures on-demand and use them in a pay-as-you-go manner. In cloud systems, requests for resource in computing, storage and networking are served by underlying physical infrastructures in data centers managed by service providers. It has been an enduring challenge to effectively reduce the cost in serving tenant requests with a minimum number of system resources while preserving the service level.

In other words, the scheduling of computing, storage, and networking resources is one of the most fundamental challenges for large scale infrastructures such as could systems. Currently, an off-the-shelf resource management system usually implements the scheduling functionality with a single scheduling strategy. Due to various reasons, the current management system is prone to sub-optimal or even poor-quality resource allocation.

SUMMARY

In view of the above problems, one of objectives of embodiments of the present disclosure is to provide a method and apparatus for a cloud system to partially solve the above and other potential problems in the prior art.

In accordance with a first aspect of the present invention, there is provided a method for a cloud system. The method includes: dynamically selecting, based on available infrastructure resources and at least one resource request, a scheduling strategy from a set of candidate scheduling strategies; and applying the selected scheduling strategy to schedule the infrastructure resources to serve the at least one resource request.

In some embodiments, dynamically selecting a scheduling strategy from a set of candidate scheduling strategies based on available infrastructure resources and at least one resource request may include: dynamically selecting the scheduling strategy based on the at least one resource request and state information of the infrastructure resources and further based on a specified scheduling target requirement and a service level requirement of the at least one resource request.

In some embodiments, the method may further include: calculating respective performances for the candidate scheduling strategies based on the scheduling target requirement and the service level requirement; and dynamically selecting the scheduling strategy based on the calculated performances.

In some embodiments, the method may further include: evaluating, the respective performances for the candidate scheduling strategies based on a plurality of predefined metrics; and selecting an optimal candidate scheduling strategy that, is better than other candidate scheduling strategies in the plurality of predefined metrics, as the scheduling strategy.

In some embodiments, the method may further include: dividing the set of candidate scheduling strategies into a plurality of subsets if the optimal candidate scheduling strategy is absent; determining respective sub-optimal candidate scheduling strategies for the plurality of subsets; and selecting the scheduling strategy from the determined respective sub-optimal candidate scheduling strategies. In these embodiments, the method may further include: applying the sub-optimal candidate scheduling strategies to obtain corresponding resource allocation results; and selecting a sub-optimal candidate scheduling strategy having an optimal resource allocation result as the scheduling strategy.

In some embodiments, the scheduling target requirement may include at least one of a minimized operation cost, minimized infrastructure resources to be used, a maximized resource allocation speed, and maximized scalability of resource allocation.

In some embodiments, dynamically selecting a scheduling strategy from a set of candidate scheduling strategies based on available infrastructure resources and at least one resource request may include: dynamically select the scheduling strategy based on the at least one resource request, state information of the infrastructure resources, and a predefined rule. In some embodiments, the predefined rule includes a mapping between a type of the at least one resource request and the candidate scheduling strategies. In some embodiments, the method may further include: determining the predefined rule based on experience related to a type of the at least one resource request or in a learning-based manner.

In some embodiments, the method may further include: collecting historical data related to the at least one resource request; determining a resource demand based on the historical data. Dynamically selecting a scheduling strategy from a set of candidate scheduling strategies based on available infrastructure resources and at least one resource request may include: selecting the scheduling strategy based on the available infrastructure resources, the at least one resource request, and the determined resource demand.

In some embodiments, the infrastructure resources may include at least one of: an underlying physical machine, a storage pool, and physical network equipment. In some embodiments, applying the selected scheduling strategy to schedule the infrastructure resources to serve the at least one resource request comprises at least one of: determining a mapping of a virtual machine to the underlying physical machine; allocating a storage space from the storage pool for supplying block storage; creating a virtual network on the physical network equipment.

In some embodiments, the method may be implemented at an apparatus independent from the cloud system or at an apparatus integrated in the cloud system.

In accordance with a second aspect of the present invention, there is provided an apparatus for a cloud system. The apparatus may include a selecting unit configured to dynamically select, based on available infrastructure resources and at least one resource request a scheduling strategy from a set of candidate scheduling strategies; and an applying unit configured to apply the selected scheduling strategy to schedule the infrastructure resources to serve the at least one resource request.

According to a third aspect of the present invention, there is provided a computer-readable storage medium having computer-readable program instructions stored thereon to perform the method according to the first aspect.

According to a fourth aspect of the present invention, there is provided a computer system including the apparatus according to the second aspect.

Through embodiments of the present disclosure, a management system of a cloud system is equipped with a plurality of scheduling strategies, instead of a single resource scheduling strategy. Each of the scheduling strategies is suitable for a certain category of resource requests and a certain state of infrastructure resources. As a result, at runtime when a single resource request or a batch of resource requests arrive, the management system may dynamically select the most appropriate scheduling strategy to apply and generate an optimal allocation scheme for the request(s), thereby achieving cost-effective operations with the service level requirement of the resource request(s) satisfied.

BRIEF DESCRIPTION OF THE DRAWINGS

The above and other objectives, features, and advantages of example embodiments of the present disclosure will become apparent through the following detailed description with reference to the accompanying drawings. Some example embodiments of the present disclosure are illustrated by way of example but not limitation in the drawings in which.

DETAILED DESCRIPTION

Principles of example embodiments disclosed herein will now be described with reference to various example embodiments illustrated in the drawings. It would be appreciated that description of those embodiments is merely to enable those skilled in the art to better understand and thus implement example embodiments of the present disclosure and is not intended for limiting the scope disclosed herein in any manner.

As described above, the scheduling of computing, storage and networking resources is one of the most fundamental challenges for large scale infrastructures such as could systems. Currently, an off-the-shelf resource management system usually implements the scheduling functionality with a single scheduling strategy. Due to various reasons, the current management system is prone to sub-optimal or even poor-quality resource allocation. Some of the reasons are as follows.

First, No Single Optimal Scheduling Strategy. The resource scheduling problem is essentially a constrained optimization problem: the scheduling algorithm is required to derive the optimal solution with regards to a specific objective function, and at the same time satisfy all service level requirements. There have been various solutions for this scheduling problem, with heuristics, integer linear programming, or some forms of their mixture as the usual suspects. That is, there is no single dominating strategy that always outperforms the others. As a result, under different circumstances (in terms of application workloads and resource demands), different resource scheduling strategies may become the best to apply.

Second, Single and Static Scheduling Strategy Traditional cloud management systems usually select and implement a single scheduling strategy, which will be applied to all incoming resource requests. When it is unclear which major target workloads the system will serve, the adopted scheduling strategy usually tends to be unbalanced in terms of multiple capability dimensions and not specifically optimized for certain workload types. In this case, it is possible that the selected scheduling strategy will result in average or even bad allocation schemes for some or most of application workloads. On the other hand, if the used scheduling strategy is specifically optimized for most of the target, workloads, its effectiveness may fast degrade when workload shifts happen.

Third, Tightly Coupled Resource Scheduling Strategy Implementation. In traditional Cloud management systems, resource scheduling implementation is tightly integrated with other parts of the systems, and it is impossible or hard to replace the existing scheduling strategy. In other words, the system design does not consider the possibility of accommodating different scheduling strategies.

Fourth, Fail to Get the Best of Multiple Scheduling Strategies. Ideally, different resource requests should be differentially handled by different scheduling strategies in order to derive the optimal allocation schemes. Unfortunately, due to the above three reasons, although there are various resource scheduling strategies, current cloud systems are unable to take full advantage of the superiority from each of the strategies.

In addition to the traditional scheduling strategies that are based on a set of predefined rules/policies, recently some novel resource scheduling strategies are inventing that leverage advanced cost-based and/or learning-based techniques and aim to derive optimal/near-optimal allocation schemes. These resource scheduling strategies have their own pros and cons and generally cannot outperform each other in any circumstances. Typically, commercial off-the-shelf (COTS) cloud management systems will select and implement a single scheduling strategy. However, in practice, faced with resource requests from different applications with diverse characteristics and service level requirements as well as different infrastructure resource states, the selected strategy cannot always guarantee optimal/near-optimal or even solidly good allocation schemes.

In embodiments of the present disclosure, there is provided an efficient and scalable approach to optimize the use of system resources for a cloud system by optimizing the scheduling and mapping of tenant requests onto underlying physical infrastructure. The concrete examples of the targeted scheduling problem can be from various resource allocation tasks such as determining the mapping of virtual machines to underlying physical machines, allocating a storage space represented by logic unit numbers (LUNs)

from a storage pool for supplying block storage, and creating a virtual network on physical network equipment such as switches.

To provide a solution to the resource scheduling problem for a cloud system, a fast, effective and scalable approach is needed. In embodiments of the present disclosure, there is proposed a novel approach with a corresponding framework that accommodates a plurality of resource allocation strategies and can determine at runtime an appropriate one from the strategies for serving cloud resource requests. The approach is characterized in that: depending on different supplying scenarios, the most optimal strategy is determined via static characteristics analysis, speculative execution, or both of them.

In embodiment of the present disclosure, two methods may be employed for the dynamic allocation strategy selection. In the first method, available allocation strategies are measured in quantity or quality according to a plurality of capability dimensions (for example, efficiency and effectiveness). To satisfy a tenant request, service level requirements and their characteristics are analyzed to determine desirable allocation strategy capabilities and then identify the best-fit one. This method works well when there is an easily identifiable mapping between different types of resource requests and their corresponding best-fit allocation strategies.

However, for some allocation requests, it would be difficult to find the best-fit allocation strategy via static analysis. As such, in another method, there is proposed an idea of predictive execution where a set or subset of allocation strategies is selected and applied to generate different allocation schemes for the same resource allocation request(s). The generated schemes are evaluated and compared with one another based on the service level requirement of the requests) and a specified objective function, and then the best allocation scheme may be selected.

Based on the above two methods, there is further proposed a framework for multi-strategy driven resource scheduling and is described how it can be integrated into a cloud environment.

To make embodiments of the present disclosure highly applicable for a cloud environment, the approach in the embodiments of the present disclosure has three key properties in achieving optimal resource scheduling that meets service level requirements of the tenants. These properties are as follows.

First, cost-effectiveness. The scheduling approach allows reduction in operation cost of the cloud environment. For example, an efficient virtual machine scheduler can allocate the virtual machines by using a minimum number of physical machines while serving as much as possible number of requests. Second, speediness. The approach must be fast. Otherwise, it will loss the agility that Cloud is supposed to offer for on-demand resource access. Third, scalability. The scheduling approach has the capability of scaling up and scaling down regardless of the available resources of the could system and the requested resources.

The resource scheduling problem in the cloud system to be solved by embodiments of the present disclosure will be analyzed from perspective of a mathematical theory.

The fundamental capability of the proposed scheduling approach is to map requested resources to infrastructure resources with a specified objective, for example, to map virtual machines to physical machines, or to map LUNs to the storage pools with minimum infrastructure resources. The mapping process can be mathematically regarded as a bin packing process: the physical machines can be regarded as bins and the virtual machines to be placed, can be regarded as objects to be packed within the bins.

The mapping process also accounts for satisfying a service level agreement (SLA) which usually covers specific requirements in various dimensions, and these requirements collectively become constraints of the mapping. For example, a resource scheduler is required to guarantee that the provisioned virtual machines are allocated with an expected CPU power, memory, capacity and the like. For the case of block storage, LUN volumes are provisioned with a required capacity, Input/Output Operations Per Second (IOPS), bandwidth, data protection scheme, and the like. That is to say, by selecting different objectives and constraints, a bin packing model can be applied in each of various resource scheduling scenarios.

The bin packing problem can be in turn formalized as a constraint programming problem with the goal to maximize/minimize a global objective function (for instance, the minimized operation cost) while considering the service level requirement.

The method, and apparatus for a cloud system in accordance with embodiments of the present disclosure will be described in detail with reference to FIGS. 1-3.

Figure 1:
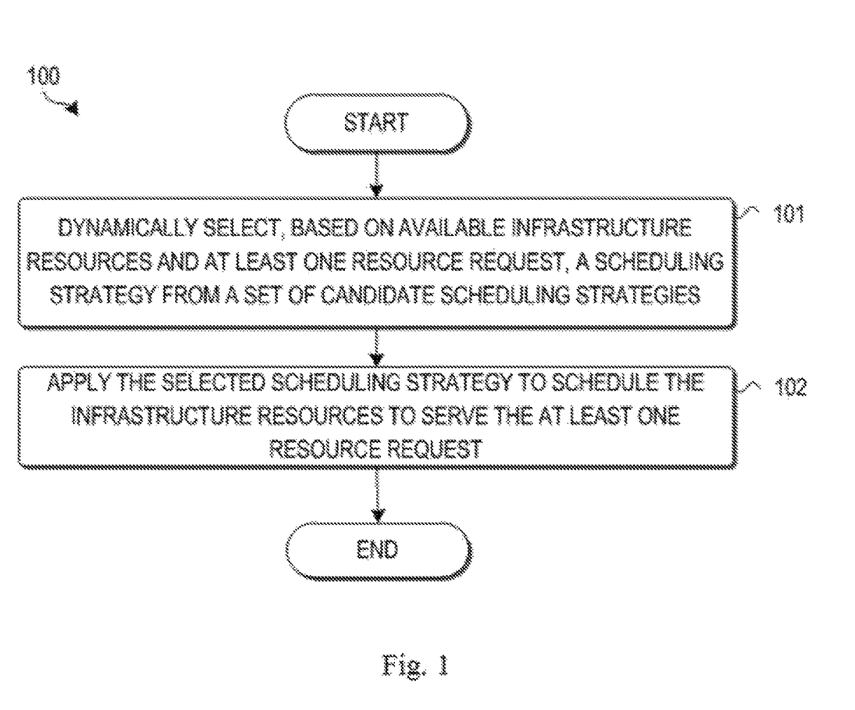
FIG. 1 illustrates a flowchart of a method for a cloud system in accordance with an embodiment of the present disclosure.

FIG. 1 illustrates a flowchart of a method 100 for a cloud system in accordance with an embodiment of the present disclosure. In some embodiments, the method 100 may be implemented by an entity related to the cloud system. In some specific embodiments, the method 100 may be implemented by an apparatus 200 to be described below with reference to FIG. 2.

As shown in FIG. 1, the method 100 enters step 101. At step 101, the entity for implementing the method 100 dynamically selects, based on available infrastructure resources and at least one resource request, a scheduling strategy from a set of candidate scheduling strategies.

As mentioned above, the core abstraction for the cloud resource scheduling problem is a mapping from the resource requests of the tenant to the available infrastructure resources. However, as the underlying infrastructure becomes bigger and more dynamic, and as the tenant service requests come into the system with a rich diversity and varied rates in service level requirement, efficient resource scheduling becomes very challenging.

In order to solve the highly dynamic, at-scale cloud resource scheduling problem so as to satisfy the service level requirement in multiple dimensions, embodiments of the present disclosure propose to provide the cloud scheduling system with a plurality of allocation strategies and dynamically choose the most appropriate one in terms of the performance in achieving the objective. It is introduced in the following how the approach of the embodiments of the present disclosure can be adaptive in handling both the diversity and dynamic features in resource scheduling by accommodating multiple strategies. In the approach, two methods are provided for dynamic scheduling strategy selection, including static characteristics analysis and speculative execution.

In some embodiments, step 101 may include: dynamically selecting the scheduling strategy based on the at least one resource request and state information of the infrastructure resources and further based on a specified scheduling target requirement and a service level requirement of the at least one resource request. Those skilled in the art would appreciate that during the scheduling of the infrastructure resources, it is possible to satisfy a specified scheduling target, to minimize the scheduling cost. In addition, a resource request as filed by the tenant might correspond to a service level requirement During the resource scheduling, the service level requirement is needed to be satisfied. In particular, the scheduling target requirement may include at least one of a minimized operation cost, minimized infrastructure resources to be used, a maximized resource allocation speed, and maximized scalability of resource allocation.

In some embodiments, the method 100 may further include: calculating respective performances of the plurality of candidate scheduling strategies based on the scheduling target requirement and the service level requirement and dynamically selecting the scheduling strategy based on the calculated performances. In these embodiments, it is possible to define a plurality of metrics to evaluate performances for the candidate scheduling strategies and then select an optimal candidate scheduling strategy that is better than other candidate scheduling strategies in the plurality of metrics, as the scheduling strategy.

Specifically, for a single resource request or a batch of resource requests, one scheduling strategy or a subset of scheduling strategies may be selected from an entire search space included of the plurality of different scheduling strategies based on scheduling situation analysis. This manner works for the case where an analytical model is available for determining how "good" each candidate scheduling strategy will be based on analysis on characteristics of the scheduling situation.

For example, for the specific case of block storage allocation, characteristics of an instance may affect how well each scheduling algorithm will perform. Such instance includes the following information: the set of LUN volumes to be allocated in one request and having a multi-dimensional SLA requirement, and the set of storage pools with corresponding capacity in multi-dimensions.

In this case, one of the possible methods for selecting the candidate strategy is to evaluate each of the strategies quantitatively with the corresponding instance characteristic, and identify the most superior one. To accomplish that, some metrics such as effectiveness and time complexity can be defined and evaluated respectively for each strategy.

In the context of the present disclosure, a "domination" relationship is defined with the meaning of "superior in every metric" in a particular situation. For example, if scheduling strategy A "dominates" scheduling strategy B, then the scheduling strategy A is superior to the scheduling strategy B in each metric, and vice versa. With regards to this "domination" relationship, the most "dominating" strategy (that is, the one that "dominates" all the others) can be selected as the final scheduling strategy.

In some embodiments, the method 100 may further include: dividing the set of candidate scheduling strategies into a plurality of subsets if the optimal candidate scheduling strategy is absent; determining respective sub-optimal candidate scheduling strategies for the plurality of subsets; and selecting the scheduling strategy from the determined sub-optimal candidate scheduling strategies.

In some embodiments, the method 100 may further include: applying the sub-optimal candidate scheduling strategies to obtain corresponding resource allocation results; and selecting a sub-optimal candidate scheduling strategy having an optimal resource allocation result as the scheduling strategy.

In practice, the above static analysis may not be able to distinguish the most superior scheduling strategy from others. This is because the "domination" relationship defined above is a partial order. That is to say, there may be two scheduling strategies A and B in a case where neither of the following expressions is true: A "dominates" B, and B "dominates" A.

In other words, they are not comparable in terms of superiority. In this case, the whole scheduling strategy space may be partitioned into multiple sub-spaces by the "domination" partial order evaluated according to the selected metrics such that: for any two scheduling strategies A and B within a same partition, either "A dominates B" or "B dominates A" holds true. In addition, for any two scheduling strategies A and B from two different partitions, neither "A dominates B" or "B dominates A" holds true.

The static analysis-based selection approach may be used to derive the most superior scheduling strategy in each of the sub-spaces. In this way, a set of candidate scheduling strategies (one from each sub-space) is obtained where none of the candidate scheduling strategy dominates any of the others. To further select a final scheduling strategy from those candidate scheduling strategies, each of the candidate scheduling strategy may be applied to generate a resource allocation scheme (a resource allocation result). Then, the resulting resource allocation schemes are collected and evaluated to select the one that outperforms the others.

In some embodiments, the step 101 may include: dynamically selecting the scheduling strategy based on the at least one resource request, state information of the infrastructure resources, and a predefined rule. In some embodiments, the predefined rule may include a mapping between the type(s) of the resource request(s) and the candidate scheduling strategies. In some embodiments, the predefined rule may be determined based on experience related to the type(s) of the resource request(s), or in a learning-based manner.

In addition to the above analysis on the basis of scheduling, for a single resource request or a batch of resource requests, it is further possible to select, based on rules, one scheduling strategy or a subset of scheduling strategies from the entire search space consisting of the different scheduling strategies.

It would be appreciated that sometimes there is no good substitute for experience and best practices. In this case, a rule-based approach allows effective decision making by matching the "working memory" with a set of rules. Such set of rules may have captured a mapping between different types of resource requests and their corresponding best-fit allocation strategies. These rules can be either derived from expertise or experience, or automatically mined with learning-based methods.

In some embodiments, the method 100 may further include: collecting historical data related to the at least one resource request; determining a resource demand based on the historical data; and the step 101 may include: dynamically selecting the scheduling strategy based on the available infrastructure resources and at least one resource request and further based on a predicted resource demand.

As explained above, the bin packing model works well with the batch-oriented resource scheduling problem. In embodiments of the present disclosure, it has been recognized that the bin packing model is also suitable for an online scenario where mini-batches of resource requests come intermittently into the scheduling system. For this online scenario, there is proposed a prediction-based scheduling model. In a specific embodiment, the prediction-based scheduling model may perform the following steps: collecting historical data of the resource requests and formulating a past demand pattern; determining the resource usage for a next scheduling interval by some regressive model; and allocating appropriate cloud resources to the predicted resource demand. As can be seen from the above, the bin packing model can be applied for the last step of this proposed method.

Then, the method 100 may proceed to step 102. At step 102, the entity for implementing the method 100 may apply the selected scheduling strategy to schedule the infrastructure resources to serve the at least one resource request.

In some embodiments, the infrastructure resources include at least one of: an underlying physical machine(s), a storage pool(s), and physical network equipment. In some embodiments, step 102 may include at least one of: determining a mapping of a virtual machine(s) to the underlying physical machine(s); allocating a storage space from the storage pool(s) for supplying block storage; creating a virtual network on the physical network equipment.

In some embodiments, the method 100 may be implemented at an apparatus independent from the cloud system or an apparatus integrated in the cloud system.

The method 100 may end after step 102.

Figure 2:
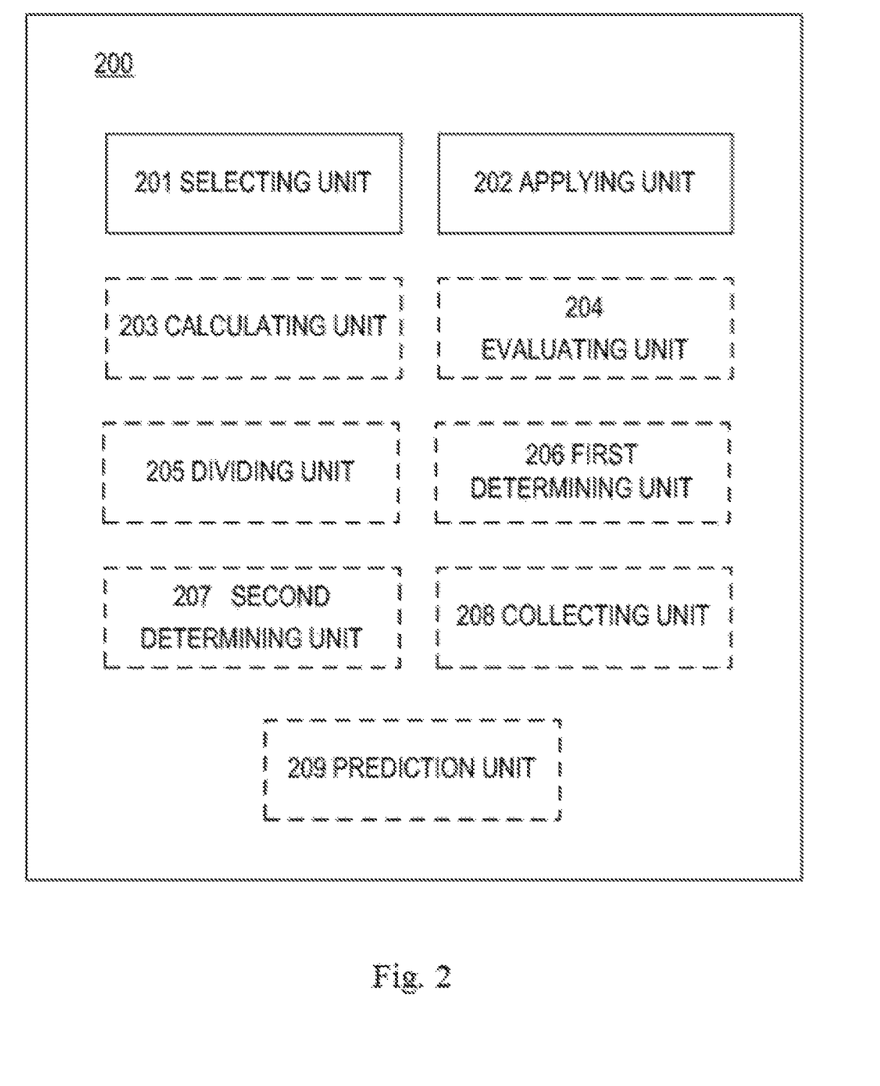
FIG. 2 illustrates a block diagram of an apparatus for a cloud system in accordance with an embodiment of the present disclosure.

FIG. 2 illustrates a block diagram of an apparatus 200 for a cloud system in accordance with an embodiment of the present disclosure. Those skilled in the art would appreciate that FIG. 2 shows only units or components of the apparatus 200 that are closely related to embodiments of the present disclosure. In some specific implementations, the apparatus 200 may include other functional units or components to support its operations. In addition, those skilled in the art may further appreciate that there may be some connections between the units of the apparatus 200. In FIG. 2, dotted-line boxes are used to represent optional units.

As shown in FIG. 2, the apparatus 200 includes a selecting unit 201 and an applying unit 202. In some embodiments, the selecting unit 201 may be configured to dynamically select, based on available infrastructure resources and at least one resource request, a scheduling strategy from a set of candidate scheduling strategies. The applying unit 202 may be configured to apply the selected scheduling strategy to schedule the infrastructure resources to serve the at least one resource request.

In some embodiments, the selecting unit 201 may be configured to: dynamically select the scheduling strategy based on the at least one resource request and state information of the infrastructure resources and further based on a specified scheduling target requirement and a service level requirement of the at least one resource request.

In some embodiments, the apparatus 200 may further include a calculating unit 203. The calculating unit 203 may be configured to calculate respective performances for the candidate scheduling strategies based on the scheduling target requirement and the service level requirement. In some embodiments, the calculating unit 201 may be configured to dynamically select the scheduling strategy based on the calculated performances.

In some embodiments, the apparatus 200 may further include an evaluating unit 204. The evaluating unit 204 may be configured to define a plurality of metrics to evaluate the performances for the candidate scheduling strategies. In some embodiments, the selecting unit 201 may be further configured to select an optimal candidate scheduling strategy that is better than other candidate scheduling strategies in the plurality of metrics, as the scheduling strategy.

In some embodiments, the apparatus 200 may further include a dividing unit 205. The dividing unit 205 may be configured to divide the set of candidate scheduling strategies into a plurality of subsets if the optimal candidate, scheduling strategy is absent. In some embodiments, the apparatus 200 may further include a first determining unit 206. The first determining unit 206 may be configured to determine respective sub-optimal candidate scheduling strategy for the plurality of subsets. The selecting unit 201 may be further configured to select the scheduling strategy from the determined sub-optimal candidate scheduling strategies.

In some embodiments, the applying unit 202 may be configured to apply the sub-optimal candidate scheduling strategies to obtain corresponding, resource allocation results. The selecting unit 201 may be configured to select a sub-optimal candidate scheduling strategy having an optimal resource allocation result as the scheduling strategy.

In some embodiments, the scheduling target requirement may include at least one of: a minimized operation cost, minimized infrastructure resources to be used, a maximized resource allocation speed, and maximized scalability of resource allocation.

In some embodiments, the selecting unit 201 may be configured to: dynamically select the scheduling strategy based on the at least one resource request, state information of the infrastructure resources, and a predefined rule. In some embodiments, the predefined rile may include a mapping between a type of the at least one resource request and the candidate scheduling strategies.

In some embodiments, the apparatus 200 may further include a second determining unit 207. The second determining unit 207 may be configured to determine the predefined rule based on experience related to a type of the at least one resource request, or in a learning-based manner.

In some embodiments, the apparatus 200 may further include a collecting unit 208 and a prediction unit 209. The collecting unit 208 may be configured to collect historical data related to the at least one resource request. The prediction unit 209 may be configured to determine a resource demand based on the historical data. In these embodiments, the selecting unit 201 may be further configured to dynamically select the scheduling strategy based on the available infrastructure resources, the at least one resource request, and the determined resource demand.

In some embodiments, the infrastructure resources may include at least one of: an underlying physical machine, a storage pool, and physical network equipment. In some embodiments, the applying unit 202 may be configured to perform at least one of: determining a mapping of a virtual machine to the underlying physical machine; allocating a storage space from the storage pool for supplying block storage; creating a virtual network on the physical network equipment.

In some embodiments, the apparatus 202 may be independent from the cloud system or integrated in the cloud system.

Figure 3:
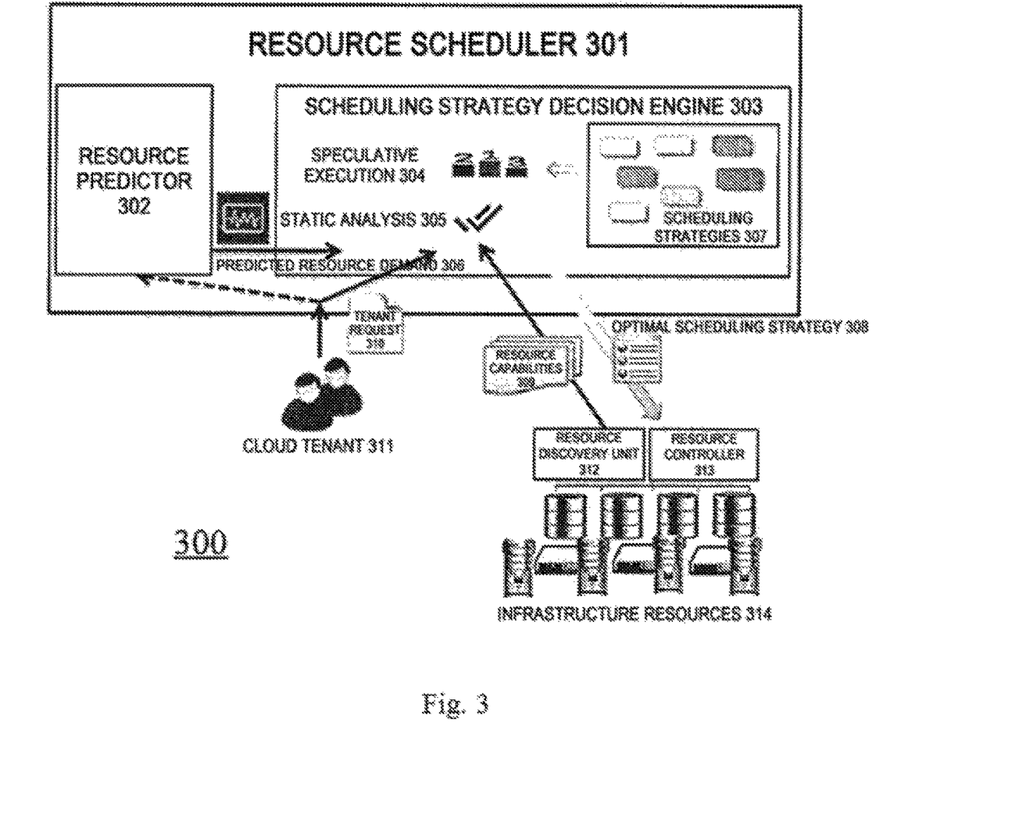
FIG. 3 illustrates a schematic diagram of an example architecture for a cloud system in accordance with an embodiment of the present disclosure.

FIG. 3 illustrates a schematic diagram of an example architecture 300 for a cloud system in accordance with an embodiment of the present disclosure. It would be appreciated that a resource scheduler 301 and the functional modules thereof in FIG. 3 are shown by way of example but not limitation, and are intended to further illustrate embodiments of the present disclosure.

The architecture in FIG. 3 illustrates a multi-strategy resource scheduling architecture with various components and interactions therebetween in accordance with embodiments of the present disclosure. As shown in FIG. 3, the example architecture 300 may include a resource scheduler 301, a resource discovery unit 312, and a resource controller 313. The resource discovery unit 312 and resource controller 313 monitor or operate the infrastructure resources 314.

In some embodiments, the resource scheduler 301 may satisfy a tenant resource requests by scheduling appropriate infrastructure resources. As shown in FIG. 3, the resource scheduler 301 may further include a resource predictor 302 and a scheduling strategy decision engine 303.

Specifically, the scheduling strategy decision engine 303 may select the most appropriate scheduling strategy from a search space of multiple different scheduling strategies. The resource predictor 302 may collect historical resource requests and make prediction for the resource demand which is provided to the scheduling strategy decision engine 303 for a scenario of online resource scheduling.

In some embodiments, the resource discovery unit 312 may provide status information of infrastructure resources as one of the inputs for situational analysis. In addition, the resource controller 313 may deploy the optimal allocation scheme generated by the scheduling strategy decision engine 303 onto underlying infrastructure.

Furthermore, the resource scheduler 301 take both the tenant request 310 submitted by cloud tenants 311 and infrastructure resource capabilities 309 discovered by the resource discovery unit 312 as inputs. Those inputs are forwarded to an internal component, the scheduling strategy decision engine 303, of the resource scheduler 301.

The scheduling strategy decision engine 303 has multiple embedded scheduling strategies 307, and can apply either of the strategy selection methods (namely, a speculative execution 304 or static analysis 305) as described above or apply a combination of the methods to derive the optimal scheduling strategy 308. The optimal scheduling strategy 308 may be applied to generate the final allocation scheme as an output. This output may in turn, be delivered as an input to the resource controller 313, which performs the actual resource allocation deployment.

In the scenario of online resource scheduling, the resource predictor 302 joins into the architecture. The resource predictor 302 keeps monitoring historical resource requests, and predicts a resource demand. 306 for a next scheduling interval based on the historical resource requests. Similarly as the batch mode scheduling process, the predicted resource demand 306 is provided for the scheduling strategy decision engine 303 as an input.

In practice, the resource scheduler 301 can be implemented as a standalone component, or embedded into an existing cloud management stack to enhance the scheduling efficiency. For example, it can be embedded into a Cinder Scheduler of a cloud system platform OpenStack to enhance block storage scheduling.

Take the Cloud storage as a specific example below to illustrate how optimal selection of resource scheduling strategies can be applied to an actual storage allocation problem.

This specific example relates to a block storage allocation problem. In this example, it would be illustrated how a scheduling algorithm is selected in the context of block storage allocation. In theory, the general resource allocation challenge for block storage can be regarded as a multi-dimensional bin-packing problem. The individual storage pool from which the application-visible LUNs are allocated is considered as bins, which have different dimensions. Similarly, the LUNs requested by applications are considered as objects to be packed into these bins. What is to be found is a scalable approach that produces mappings between these objects and bins, such that the operating costs are minimized within the specific context.

By further generalization, the bin-packing model can be easily extended to cover a multi-dimensional variable-sized vector packing problem. This extension can be used to model the storage resource allocation problem with service level constraints in multiple dimensions with heterogeneous storage units. For this particular example, the objective may be defined as maximizing storage consolidation (that is, using as few storage pools as possible).

Regarding available allocation methods, traditionally a solution to the bin-packing problem can be achieved with some generic MIP (Mixed-Integer Programming) solvers such as Gurobi. However, even for a single-dimensional bin-packing problem, it has been approved that finding the optimal feasible solution to an Integer Linear Programing is a combinatorial NP-hard problem. This means that algorithms designed for obtaining optimal solutions usually do not scale well with a very large number of instances of the problem.

To enable a responsive solution, many other alternatives are devised. One of the approaches is to use heuristics algorithms. Some of the examples include a First Fit algorithm, a First-Fit Decreasing algorithm, a Best Fit Decreasing algorithm, and an Adapted Best Fitting Decreasing (A-BFD) algorithm. These algorithms allow fast but near-optimal solutions. The computation complexity for those algorithms is usually quadratic, which is the reason that they are much faster than the sophisticated algorithm underpinning the Integer Linear Programing solver. Empirically, these heuristic approaches can yield near-optimal solutions.

Even for heuristics algorithms, there exist multiple strategies such as an object-centric strategy and a bin-centric strategy. As the different instance characteristics (such as distributions of object sires and bin sizes) change, the algorithm from one strategy may outperform algorithms from other strategies and no one size fits all.

The selection of the optimal method is now discussed. Base on above observations, the optimal selection of the scheduling solution can apply the strategy as follows.

First, the number of instances is evaluated, which includes information on the number of bins, the number of objects, and the number of dimensions for matching.

Second, in static analysis, if the storage infrastructure is not overloaded (which means that there are still a lot of bins with free space) and the allocation request is non-trivial (that is, quite a lots of objects are to be packed with multi-dimensional service level constraints), the exact-solution will be excluded because of its prohibitive computation expenses. Otherwise, it is possible to derive the optimal solution with the exact-method.

Third, to further select a solution among all non-exact solutions, it is possible to continue to evaluate the instance characteristics. At this time, the distributions of requested sizes for respective dimensions may be scrutinized. Based on the evaluated characteristics, it is determined to make a decision of using a bin-centric or object-centric heuristics algorithm.

Finally multiple heuristics algorithms may be determined from the obtained subsets of allocation strategies and the most optimal solution may be selected based on their results.

Figure 4:
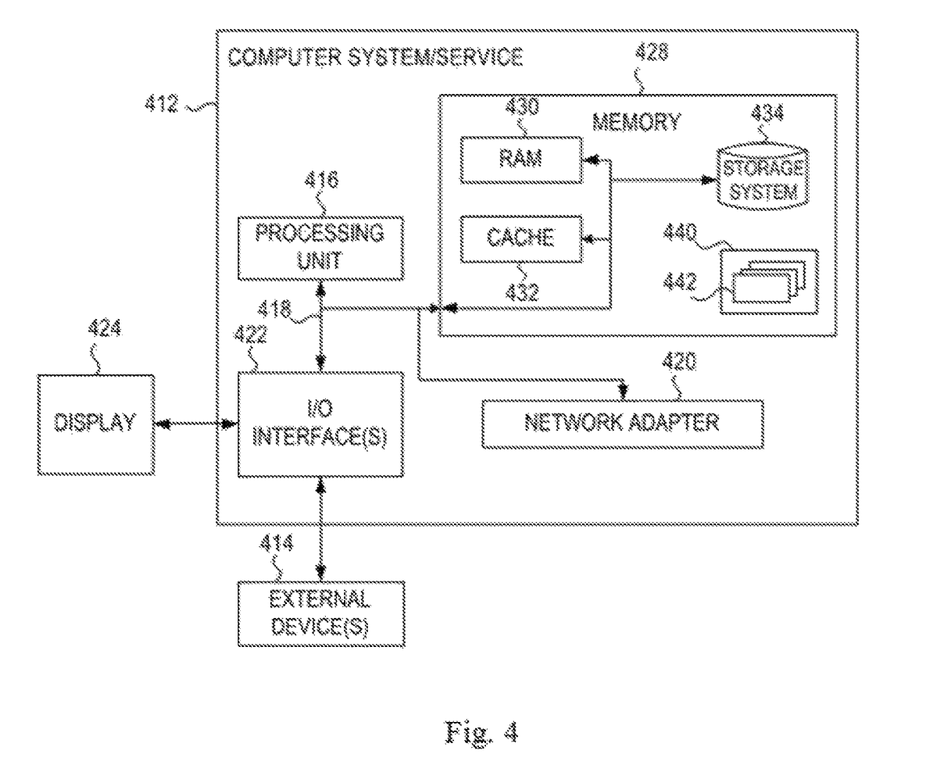
FIG. 4 illustrates a block diagram of an example computer system/server where embodiments of the present disclosure can be implemented.

FIG. 4 illustrates a block diagram of an example computer system/server 412 which is applicable to implement the embodiments of the present disclosure. It would be appreciated that the computer system/server 412 shown in FIG. 4 is only illustrative and is not intended to suggest any limitation as to the scope of use or functionality of embodiments of the invention described herein.

As shown in FIG. 4, computer system/server 412 is shown in the form of a general-purpose computing device. The components of computer system/server 412 may include, but are not limited to, one or more processors or processing units 416, a system memory 428, and a bus 418 that couples various system components including system memory 428 to processor 416.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral. Component Interconnect (PCI) bus.

Computer system/server 412 typically includes a variety of computer system readable media. Such media may be any available media that is accessible by computer system/server 412, and it includes both volatile and non-volatile media, removable and non-removable media.

System memory 428 can include computer system readable media in the form of volatile memory, such as random access memory (RAM) 430 and/or cache memory 432. Computer system/server 412 may further include other removablenon-removable, volatile/non-volatile computer system storage media. Although not shown in FIG. 4, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces. Memory 428 may include at least one program product having a set (e.g., at least one) of program modules that are configured to carry out the functions of embodiments of the invention.

Program/utility 440, having a set (at least one) of program modules 442, may be stored in memory 428 by way of example, and not limitation, as well as an operating system, one or more application programs, other program modules, and program data. Each of the examples or some combination thereof, may include an implementation of a networking environment. Program modules 442 generally carry out the functions and/or methodologies of embodiments of the invention as described herein.

Computer system/server 412 may also communicate with one or more external devices such as a display device 424, a storage device 414, and the like, with one or more devices that enable a tenant to interact with computer system/server 412, and/or with any devices (e.g., network cards, modems, and the like.) that enable computer system/server 412 to communicate with one or more other computing devices. Such communication can occur via Input/Output (I/O) interfaces 422. Still yet, computer system/server 412 can communicate with one or more networks such as a local area network (LAN), a general wide area network (WAN), and/or a public network (e.g., the Internet) via network adapter 420. As depicted, network adapter 420 communicates with the other components of computer system/server 412 via bus 414. It should be understood that although not shown, other hardware and/or software components could be used in conjunction with computer system/server 412. Examples, include, but are not limited to: microcode, device drivers, redundant processing units, external disk drive arrays, RAID systems, tape drives, and data archival storage systems, and the like.

Embodiments of the present disclosure are closely related to EMC's storage division. The approach of optimized resource scheduling with multiple allocation strategies can be beneficial for storage allocation in any large scale deployment such as Cloud and Software-Defined Data Center (SDDC). This approach can be implemented as a standalone component, or as a plug-in for existing products such as ViPR®, which is the controller of Software-defined Storage from EMC.

In the description of embodiments of the present invention, the term "include" and other similar expressions should be understood as an inclusion in an open, manner, i.e., "include, but are not limited to. The term "based on" should be understood as "based on at least in part". The terms "an embodiment" or "the embodiment" should be understood as "at least one embodiment."

It should be appreciated that embodiments of the present invention may be implemented by hardware, software, or any combination thereof. The hardware part may be implemented using a dedicated logic; the software part may be stored in a memory and executed by an appropriate instruction execution system, e.g., a microprocessor or a dedicated designed hardware. Those ordinary skilled in art would understand that the above apparatuses and methods may be implemented using computer-executable instructions and/or may be included in processor control code. In some implementations, such code is provided on a medium such as a programmable memory, or a data carrier such as an optical or electronic signal carrier.

In addition, although method operations of the present disclosure are described in a particular order in the drawings, it does not require or imply that these operations must be performed according to this particular sequence, or a desired outcome can only be achieved by performing all of the shown operations. On the contrary, the execution order of the steps as illustrated in the flowcharts may be varied. Alternatively, or in addition, some steps may be omitted, a plurality of steps may be merged into one step, and/or a step may be divided into a plurality of steps for execution. It would be appreciated that features and functions of two or more devices according to the present invention may be embodied in one device. In some cases, features and functions of one device as illustrated above may be further divided into and embodied at multiple devices.

Although the present invention has been illustrated with reference to various embodiments, it should be understood that the present invention is not limited to the disclosed embodiments but is intended to cover various modifications and equivalents within the spirit and scope of the appended claims.

What is claimed is:

1. A method for a cloud system, comprising:
dynamically selecting, based on available infrastructure resources and at least one resource request, a scheduling strategy from a set of candidate scheduling strategies;
applying the selected scheduling strategy to schedule at least one infrastructure resource of the available infrastructure resources to serve the at least one resource request;
wherein dynamically selecting a scheduling strategy from a set of candidate scheduling strategies based on available infrastructure resources and at least one resource request comprises:
dynamically selecting the scheduling strategy based on the at least one resource request and state information of the at least one infrastructure resource of the available infrastructure resources and further based on a specified scheduling target requirement and a service level requirement of the at least one resource request;

calculating respective performances for the set of candidate scheduling strategies based on the scheduling target requirement and the service level requirement;

dynamically selecting the scheduling strategy based on the calculated respective performances;

evaluating the respective performances for the set of candidate scheduling strategies based on a plurality of predefined metrics;

selecting an optimal candidate scheduling strategy that is better than other candidate scheduling strategies in the plurality of predefined metrics, as the scheduling strategy;

dividing the set of candidate scheduling strategies into a plurality of subsets if the optimal candidate scheduling strategy is absent;

determining respective sub-optimal candidate scheduling strategies for the plurality of subsets;

selecting the scheduling strategy from the determined sub-optimal candidate scheduling strategies;

applying the sub-optimal candidate scheduling strategies to obtain corresponding resource allocation results; and selecting a sub-optimal candidate scheduling strategy having an optimal resource allocation result as the scheduling strategy.

2. The method according to claim 1, wherein the scheduling target requirement includes at least one of a minimized operation cost, minimized infrastructure resources to be used, a maximized resource allocation speed, and maximized scalability of resource allocation.

3. The method according to claim 1, wherein dynamically selecting a scheduling strategy from a set of candidate scheduling strategies based on the at least one infrastructure resource of the available infrastructure resources and at least one resource request comprises:

dynamically select the scheduling strategy based on the at least one resource request, state information of the infrastructure resources, and a predefined rule.

4. The method according to claim 3, wherein the predefined rule includes a mapping between a type of the at least one resource request and the set of candidate scheduling strategies.

5. The method according to claim 3, further comprising:
determining the predefined rule based on experience related to a type of the at least one resource request or in a learning-based manner.

6. The method according to claim 1, further comprising:
collecting historical data related to the at least one resource request; and
determining a resource demand based on the historical data,
wherein dynamically selecting a scheduling strategy from a set of candidate scheduling strategies based on available infrastructure resources and at least one resource request comprises:
selecting the scheduling strategy based on the available infrastructure resources, the at least one resource request, and the determined resource demand.

7. The method according to claim 1, wherein the at least one infrastructure resource of the available infrastructure resources include at least one of an underlying physical machine, a storage pool, and physical network equipment.

8. The method according to claim 7, wherein applying the selected scheduling strategy to schedule the at least one infrastructure resource of the available infrastructure resources to serve the at least one resource request comprises at least one of:

determining a mapping of a virtual machine to the underlying physical machine;

allocating a storage space from the storage pool for supplying block storage; and creating a virtual network on the physical network equipment.

9. The method according to claim 1, wherein the method is implemented at an apparatus independent from the cloud system or at an apparatus integrated in the cloud system.

10. An apparatus for a cloud system, comprising:
a selecting unit configured to dynamically select, based on available infrastructure resources and at least one resource request, a scheduling strategy from a set of candidate scheduling strategies;

an applying unit configured to apply the selected scheduling strategy to schedule at least one infrastructure resource of the available infrastructure resources to serve the at least one resource request;

wherein the selecting unit is configured to:
dynamically select the scheduling strategy based on the at least one resource request and state information of the at least one infrastructure resource of the available infrastructure resources and further based on a specified scheduling target requirement and a service level requirement of the at least one resource request;

a calculating unit configured to calculate respective performances for the set of candidate scheduling strategies based on the scheduling target requirement and the service level requirement, wherein the calculating unit is configured to dynamically select the scheduling strategy based on the calculated respective performances;

an evaluating unit configured to evaluate the respective performances for the set of candidate scheduling strategies based on a plurality of predefined metrics, wherein the selecting unit is configured to select an optimal candidate scheduling strategy that is better than other candidate scheduling strategies in the plurality of predefined metrics, as the scheduling strategy;

a dividing unit configured to divide the set of candidate scheduling strategies into a plurality of subsets if the optimal candidate scheduling strategy is absent;

a first determining unit configured to determine respective sub-optimal candidate scheduling strategies for the plurality of subsets;

wherein the selecting unit is configured to select the scheduling strategy from the determined sub-optimal candidate scheduling strategies;

wherein the applying unit is further configured to apply the sub-optimal candidate scheduling strategies to obtain corresponding resource allocation results; and wherein the selecting unit is configured to select a sub-optimal candidate scheduling strategy having an optimal resource allocation result as the scheduling strategy.

* * * * *